(12) United States Patent
Callahan

(10) Patent No.: US 11,213,145 B2
(45) Date of Patent: Jan. 4, 2022

(54) CARAFE FOR DISPENSING HOT AND COLD LIQUID

(71) Applicant: Heatworks Technologies, Inc., Sullivans Island, SC (US)

(72) Inventor: Jeremiah M. Callahan, Sullivan's Island, SC (US)

(73) Assignee: Heatworks Technologies, Inc., Sullivan's Island, SC (US)

( * ) Notice: Subject to any disclaimer, the term of this patent is extended or adjusted under 35 U.S.C. 154(b) by 0 days.

(21) Appl. No.: 16/725,204

(22) Filed: Dec. 23, 2019

(65) Prior Publication Data

US 2020/0214482 A1 Jul. 9, 2020

Related U.S. Application Data

(60) Provisional application No. 62/788,237, filed on Jan. 4, 2019.

(51) Int. Cl.
*A47G 19/12* (2006.01)
*A47J 36/24* (2006.01)

(52) U.S. Cl.
CPC ......... *A47G 19/127* (2013.01); *A47J 36/2483* (2013.01)

(58) Field of Classification Search
CPC ....... A42B 3/042; A42B 3/0453; A42B 3/125; A42B 3/205; A42B 3/22; A42B 3/227; A42B 3/28; A42B 3/303; A42B 3/306; A47G 19/127; A47G 19/14; A47J 27/21041; A47J 36/2483; A47J 27/21008;
(Continued)

(56) References Cited

U.S. PATENT DOCUMENTS 1,121,993 A * 12/1914 Eichler .................. A47G 19/12
 210/515
2,135,410 A * 11/1938 Ottoson ................ A47G 19/14
 222/129
(Continued)

FOREIGN PATENT DOCUMENTS

GB 2409957 A 7/2005
GB 2515828 A 1/2015
WO 2011133978 A1 10/2011

OTHER PUBLICATIONS

International Search Report including the Written Opinion from Application No. PCT/US2019/068355 dated Apr. 17, 2020, 15 pages.

*Primary Examiner* — Vishal Pancholi
*Assistant Examiner* — Bob Zadeh
(74) *Attorney, Agent, or Firm* — Lerner, David, Littenberg, Krumholz & Mentlik, LLP

(57) ABSTRACT

A portable carafe has a reservoir (14) for holding a liquid, a hot liquid outlet (18) and a hot liquid flow path (22) connecting the reservoir to the hot liquid outlet. A heater (28) is arranged in the hot liquid flow path so that the heater can heat liquid passing from the reservoir (14) to the hot liquid outlet (18). The heater (28) may be inactive when no liquid is passing through the hot liquid flow path, and may be active only when hot liquid is to be dispensed. The carafe may include a battery (50) for powering the heater. The carafe may include a cold liquid outlet (20) and a cold liquid flow path (34), and may be arranged so that tilting the carafe in one direction causes hot liquid to be dispensed, whereas tilting the carafe in another direction causes cold liquid to be dispensed.

7 Claims, 4 Drawing Sheets

(58) Field of Classification Search
CPC ........ A47J 27/21; A47J 31/545; A47J 31/542; H04B 1/385; H04B 2001/3866; H04W 4/10; H04W 4/80; H04W 84/18
See application file for complete search history.

(56) References Cited

U.S. PATENT DOCUMENTS

| | | | | |
|---|---|---|---|---|
| D163,095 S | * | 5/1951 | Davis | D7/315 |
| 3,155,284 A | * | 11/1964 | Forman | A47G 19/14 222/144 |
| 3,998,351 A | * | 12/1976 | Smith | A47G 19/14 220/23.83 |
| 5,072,858 A | * | 12/1991 | Brashier | A47G 19/12 222/144.5 |
| 6,053,401 A | * | 4/2000 | Andrews, Sr. | B65D 77/065 220/495.03 |
| D522,795 S | * | 6/2006 | Bowron | D7/312 |
| 7,817,906 B2 | | 10/2010 | Callahan et al. | |
| 8,861,943 B2 | | 10/2014 | Bowers et al. | |
| 2008/0228142 A1 | * | 9/2008 | Elazari-Volcani | A61M 5/44 604/114 |
| 2011/0072978 A1 | * | 3/2011 | Popescu | A47G 19/2227 99/288 |
| 2012/0145705 A1 | * | 6/2012 | Wilt | A47G 19/14 220/4.21 |

\* cited by examiner

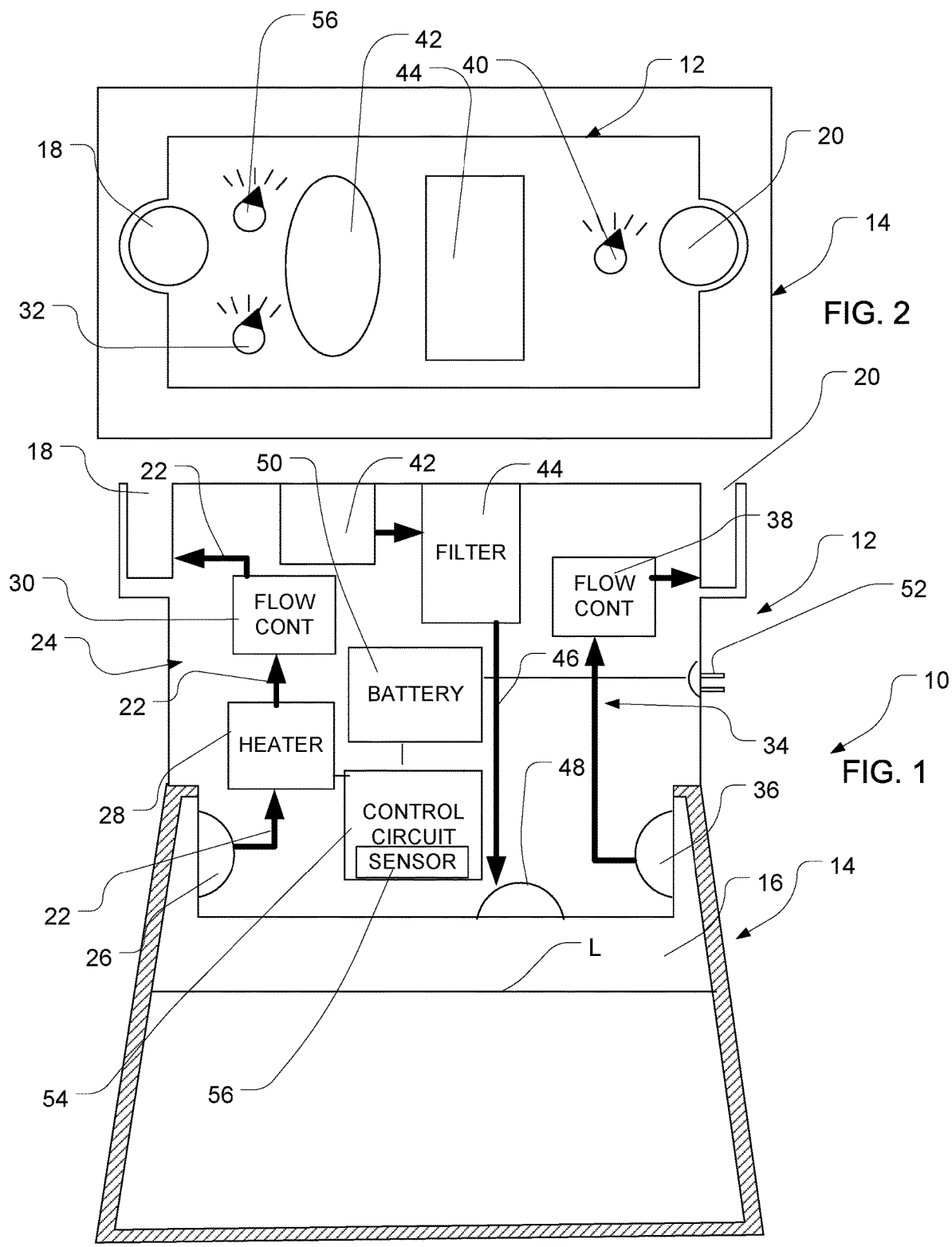

CARAFE FOR DISPENSING HOT AND COLD LIQUID

CROSS-REFERENCE TO RELATED APPLICATIONS

This application claims the benefit of the filing date of U.S. Provisional Patent Application No. 62/788,237, filed Jan. 4, 2019, the disclosure of which is incorporated herein by reference.

BACKGROUND

The present invention relates to carafes for dispensing liquids.

SUMMARY

One aspect of the invention provides a portable carafe for dispensing a liquid. The carafe according to this aspect of the invention desirably includes a housing defining a reservoir and one or more liquid outlets, and means for detecting when hot liquid is to be discharged through the one or more liquid outlets. The carafe according to this aspect of the invention desirably also includes structure disposed in the housing defining one or more flow paths connecting the reservoir and the one or more outlets, as well as a heater disposed in the housing, the heater being active to heat liquid flowing from the reservoir to the one or more liquid outlets to a set point temperature when hot liquid is to be discharged, the heater being inactive when no hot liquid is to be discharged.

Preferably, the heater is a "ohmic" heater having a plurality of electrodes arranged to contact liquid flowing along one of the flow paths and heat the liquid by applying different voltages to different ones of the electrodes so that a current flows between the electrodes through the liquid. For example, the electrodes may be arranged in pairs. One electrode of a pair may be maintained at a neutral voltage. A voltage different from the neutral voltage is applied to the other electrode of the pair while the heater is active. In certain embodiments, the carafe is capable of dispensing either hot liquid or cold liquid through the one or more liquid outlets, and the means for determining is operative to determine whether hot liquid is to be dispensed and when cold liquid is to be dispensed. A control circuit may be provided, the control circuit being operative to control the ohmic heater to heat the liquid to the set point temperature when hot liquid is being discharged. The control circuit also may be operative to activate the heater when the means for detecting indicates that hot liquid is to be discharged, and to deactivate the heater when no hot liquid is to be discharged. Thus, a portable carafe according the foregoing aspect of the invention and having these preferred features may include:

(a) a housing defining a reservoir and one or more liquid outlets;

(b) means for detecting when hot liquid is to be discharged through the one or more liquid outlets and when cold liquid is to be discharged from the one or more liquid outlets;

(c) structure disposed in the housing defining one or more flow paths connecting the reservoir and the one or more outlets;

(d) an ohmic heater disposed in the housing, the ohmic heater being operative to heat liquid by directing an electrical current through the liquid; and (e) a control circuit operative to activate the ohmic heater and control the ohmic heater to heat liquid flowing from the reservoir to the one or more liquid outlets to a set point temperature when the means for detecting indicates that hot liquid is to be discharged and deactivate the heater when no hot liquid is to be discharged.

A portable carafe for dispensing a liquid according to a further aspect of the invention preferably includes a housing defining a housing defining a cold liquid reservoir, a cold liquid spout and a hot liquid spout separate from the cold liquid spout. The carafe desirably also includes a flow structure disposed in the housing defining one or more flow paths connecting the reservoir with the spouts so that liquid will be dispensed from the reservoir through the cold liquid spout when the housing is tilted toward the could liquid spout and liquid will be dispensed from the hot liquid spout when the housing is tilted toward the hot liquid spout. The carafe according to this aspect of the invention desirably also includes a heater disposed in the housing and connected in one of the one or more flow paths so that the heater can heat liquid flowing from the reservoir to the hot liquid spout.

The carafe according to this aspect of the invention desirably includes a control circuit operative to control the heater to heat liquid flowing from the reservoir to the hot liquid spout to a set point temperature. Desirably, the heater is active only when heated liquid is to be dispensed from the hot liquid spout. For example, the control circuit may be operative to activate the heater when liquid is flowing to the hot liquid spout and to deactivate the heater when no liquid is flowing to the hot liquid spout. Here again, the heater may be an ohmic heater operative to heat liquid by directing an electrical current through the liquid. In the carafe according to this aspect of the invention, the one or more flow paths may include a hot liquid flow path extending through the heater and a cold liquid flow path which does not extend through the heater. The carafe may be arranged so that tilting the carafe in one direction will direct liquid through the hot liquid flow path to the hot liquid spout, whereas tilting the carafe in a second direction different from the first direction will direct liquid through the cold liquid path to the cold liquid spout. In this e arrangement, the user can choose to dispense either hot or cold liquid merely by tilting the carafe in the appropriate direction. For example, the hot liquid spout may be disposed on a first side of the housing and the hot liquid flow path may have a first inlet port communicating with the reservoir on the first side of the housing. The cold liquid spout may be disposed on a second side of the housing opposite from the first side, the cold liquid flow path having a second inlet port communicating with the reservoir on the second side of the housing.

A carafe according to either of the foregoing aspects of the invention may further include a battery, and the heater may be arranged draw power from the battery when the heater is activated. For example, the control circuit as discussed above may be operative to control the ohmic heater draw power from the battery. Most preferably, the battery is disposed within the housing.

The features of both aspects of the invention may be used together, as shown in certain exemplary embodiments discussed below.

BRIEF DESCRIPTION OF THE DRAWINGS

FIG. 1 is a diagrammatic sectional view of a carafe according to one embodiment of the invention in a rest position.

FIG. 2 is a diagrammatic top plan view of the carafe of FIG. 1.

DETAILED DESCRIPTION

Figure 4:
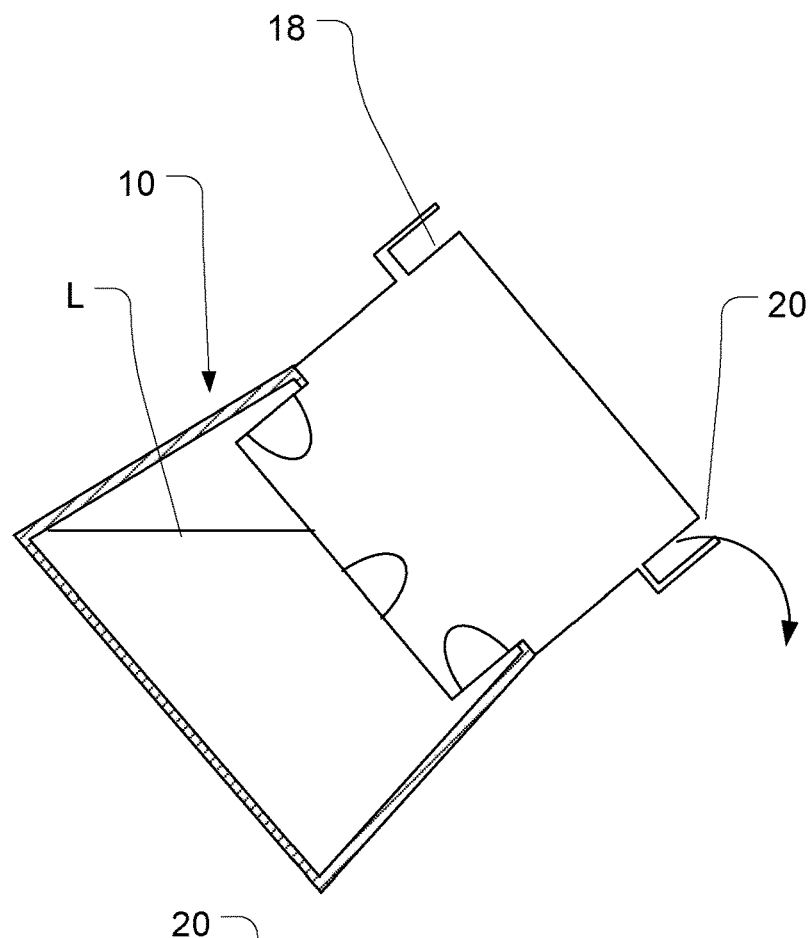
FIGS. 3 and 4 are diagrammatic sectional views depicting the carafe of FIG. 1 in tilted positions during operation.

A carafe according to one embodiment of the present invention includes a housing 10 (FIG. 1) which includes an upper body 12 and a lower body 14. The lower body 14 is hollow and defines a reservoir 16 for storage of a liquid, most typically water, to be dispensed. The upper body 12 desirably is releasably connected to the lower body 14 as, for example, by a latch mechanism (not shown) which can be readily operated by the user to detach the lower body 14 from the upper body so that the interior of the lower body can be cleaned. A seal (not shown) is provided at the juncture of the upper and lower bodies so that liquid cannot leak from the carafe at the juncture.

As used in this disclosure, terms such as "upper," "lower," "upwardly," and "downwardly" are used with reference to the position and orientation of the elements of the carafe when the carafe is in a neutral or rest position, as depicted in FIG. 1 as, for example, when the bottom of lower portion 14 is resting on a table or the like.

The upper body 12 defines a hot liquid spout 18 and a cold liquid spout 20, seen in cross-sectional view in FIG. 1. The hot liquid spout is disposed on a first side of the housing (toward the left as seen in FIGS. 1 and 2), whereas the cold liquid spout is disposed on a second side (to the right as seen in FIG. 1), opposite from the first side. Elements mounted within the upper body 12 of the housing are shown schematically in FIG. 1. A structure including conduits 22, schematically indicated by arrows in FIG. 1, defines a hot liquid flow path 24. The upper body has a first inlet port 26 disposed on the first or left side of the housing adjacent the top of reservoir 16. The hot liquid flow path extends from the first port 26 to the first spout 18. A heater 28 is connected in the hot liquid flow path so that the heater can heat water as it flows along the hot liquid flow path. The heater 28 desirably is an electrically-actuated heater. Most preferably, heater 28 is an ohmic heater. An ohmic heater is arranged to heat a liquid by directing electrical current through the liquid itself. As disclosed, for example, in U.S. Pat. Nos. 7,817,906 and 8,861,943, the disclosures of which are hereby incorporated by reference herein and copies of which are annexed hereto as a part of this disclosure, an ohmic heater desirably includes a plurality of electrodes arranged to contact liquid flowing through the heater. The electrodes can be connected to opposite poles of a source of electrical power so as to define numerous different current paths between the poles. By selectively connecting appropriate electrodes to the power source, current paths having different electrical resistances can be provided so as to vary the power applied to the liquid.

A flow control element 30, such as a throttling valve or a metering pump, desirably is connected in the hot liquid flow path 24. The flow control element 30 is linked to a user input control, schematically depicted as a rotatable knob 32 accessible to the user. The user can set user input element 32 to any one of a range of settings so as to set the flow control element 30. Although user input element 32 is depicted as a knob with adjacent indicia, any form of user input element can be employed. For example, if flow control element 30 is electrically controlled, the user input element 32 may be in the form of a button, touch screen, or other element commonly employed to input information into a digitally controlled system. In other arrangements, the user input can be entered in a remote device such as a dedicated remote control unit or a "smart" cell phone and transferred by RF or other communications medium to a receiving device mounted in the housing. Where flow control valve is a mechanical valve, the user input element may be mechanically linked to the flow control valve.

The structure within the upper body further includes conduits defining a cold liquid flow path 34 extending between a second port 36 in upper body 12 and the cold liquid spout 20. The second port is disposed on the second side of the housing, near the top of reservoir 16. A flow control element 38 is connected in the cold liquid flow path 34. Element 38 may include any of the devices discussed above with reference to the flow control element 30 in the hot liquid path. The flow control element 38 in the cold liquid path is linked to a user input 40 so that the user can adjust the flow rate through cold liquid path 34.

A filling opening 42 is provided at the top upper body 12. The filling opening 42 is connected through a filling flow path 46 to a fill port 48 which communicates with the housing. A filter 44 is provided in the filling flow path. Filter 44 may be a conventional replaceable cartridge filter adapted to remove contaminants from water. A check valve (not shown) may be provided in the fill path to prevent liquid from flowing from the reservoir 16 to the fill port during use of the carafe. In a variant, the filling flow path may communicate with reservoir 16 via one or both of the first port 16 and the second port 36, and fill port 48 may be omitted.

An electrical power source 50 is mounted within the upper body 12 of the housing. In the embodiment depicted, the electrical power source includes a rechargeable battery which is electrically connected to terminals 52 on the exterior of the upper body. Terminals are arranged to connect with an external charger (not shown) which in turn is connected to utility power. In a variant, the external terminals may be replaced by an inductive or capacitive coupling arrangement for "wireless" connection between the battery and the charger. In a further variant, the battery may be omitted and the power source 50 may include conductive elements within the housing which are connected, either directly or through an external transformer, to a conventional plug, which in turn will connect to a source of utility power such as a household electrical outlet.

A control circuit 54 is connected to the electrical power source 50 and to heater 28. The control circuit may be an analog circuit or, more typically, a digital circuit including a programmable processor and memory storing data and instructions for execution by the processor. The control circuit is arranged to control heater 28 that the heater 28 heats liquid flowing through it to a set point temperature. For example, where heater 30 is an ohmic heater as discussed above, the control circuit may be responsive to one or more temperature sensors (not shown) such as thermistors or resistive sensors to actuate switches (not shown) such as semiconductor switching elements so as to selectively connect different electrodes of the heater to the power source, and thus vary the power dissipated by the heater. In one example, the control circuit executes a feedback control operation so that it increases the power when the temperature of liquid flowing through the heater is below the set point temperature, and decreases the power when the temperature of the liquid is above the set point temperature. The set point temperature is selectable by the user input 56. User input 56 is schematically shown as a knob, but typically includes a device suitable for input of digital information. For example, a touchscreen or keyboard may be employed or, as discussed above, a remote device may supply the setting to a receiver disposed in the housing. Typically, the entire control circuit 54 is disposed within housing 10. However, the control circuit may include elements remote from the housing which are connected to other elements of the circuit by a communication medium as, for example, radio frequency communication.

Figure 3:
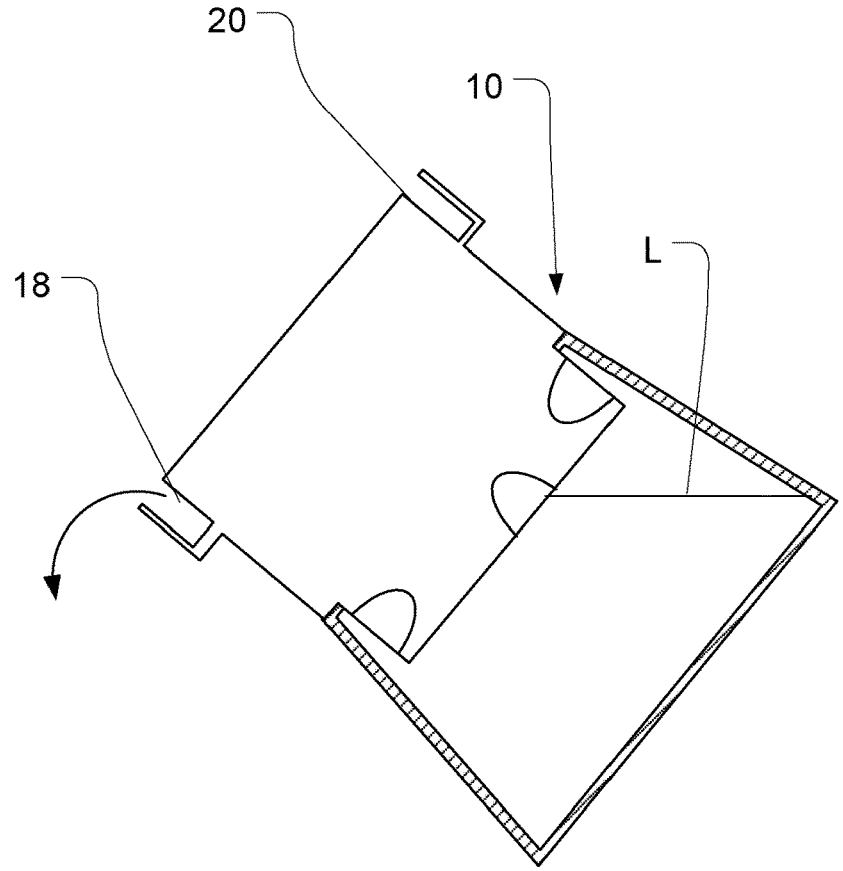

In operation, the user fills the carafe with a liquid to be dispensed, most typically water, through the filling opening 40. The liquid level L in the neutral or rest position shown in FIG. 1 is disposed below the spouts 18 and 20, so that no liquid is dispensed. The user can dispense hot water from the reservoir by tilting the housing toward the first side (to the left as seen in the drawings) so as to lower the hot liquid spout 18 below the liquid level, as depicted in FIG. 3. In this condition, water flows from the reservoir through the hot liquid path 24 (FIG. 1) to the hot liquid spout 18, and thus passes through heater 28, which heats the liquid to the set point temperature. In this condition, the cold liquid spout 20 is disposed above the liquid level L, so no liquid passes through the cold liquid path 34 to spout 20.

The user can dispense cold water from the reservoir by tilting the housing toward the second side (to the right as seen in the drawings) so as to lower the cold liquid spout 20 below the liquid level, as depicted in FIG. 4. In this condition, water flows from the reservoir through the cold liquid path 34 (FIG. 1) to the cold liquid spout 20. In this condition, the hot liquid spout 18 is disposed above the liquid level L, so no liquid passes through the hot liquid path 34 to spout 18, and thus no liquid flows through heater 28.

Preferably, the control circuit 54 is arranged to maintain heater 28 in an "off" condition, with no power being dissipated in the heater, when no liquid is flowing through the hot liquid path and heater. For example, where the heater is an ohmic heater, the switches which connect the individual electrodes to the power supply may be open, so that the electrodes are disconnected from the power supply. The control circuit is arranged to actuate the heater only when liquid is flowing through it or when flow through the heater is imminent. For this purpose, the control circuit 54 may include one or more sensors 56, schematically depicted in FIG. 1. Sensors 56 may include a flowmeter as, for example, an ultrasonic flowmeter arranged to directly detect flow in hot liquid path 24. Alternatively, or additionally, sensors 56 may include a pressure sensor arranged to detect pressure within the hot liquid path; an increase in pressure indicates that the housing has been tilted in the first direction, as in FIG. 3, such that flow is imminent or occurring. Alternatively or additionally, sensors 56 may include a sensor which detects tilting of the housing directly as, for example, a microelectromechanical ("MEMS") sensor which is responsive to the force of gravity on a mass included in the sensor.

Because the heater dissipates no power when there is no flow through it, the only power consumed while the carafe is in the neutral or rest position (FIG. 1) or while the carafe is dispensing cold liquid (FIG. 4) is the minimal power consumed by the control circuit. Stated another way, the heater 28 operates in an "instantaneous" mode; it does not maintain a reservoir of hot liquid when no hot liquid is being dispensed. This makes it practical to operate the carafe using battery power. Desirably, the heater and the control circuit are arranged so that the heater can bring the flowing liquid to a temperature within a small temperature tolerance from the set point temperature within the time taken to dispense a small volume of liquid such as a few cm$^3$ as, for example, within an interval of a few seconds or less. An ohmic heater is particularly well suited to this purpose.

As explained in the publications and patents referred to above, the power dissipated by an ohmic heater, and hence the temperature rise of the liquid passing through the heater, varies significantly with the conductivity of the liquid. Also, the temperature rise of the liquid passing through the heater is inversely related to the flow rate of the liquid through the heater. The temperature of liquid discharged also varies with the inlet temperature. At the inception of flow through the heater, the control system may set the switches controlling the ohmic heater based upon a measured conductivity and temperature of the liquid, and on an expected flow rate based on the setting of the flow control element 30, so that the initial setting is predicted to yield liquid at or near the setpoint temperature. Starting the heater at such an initial setting can further reduce the time required for the temperature of the discharged liquid to stabilize at the set point temperature.

Figure 5:
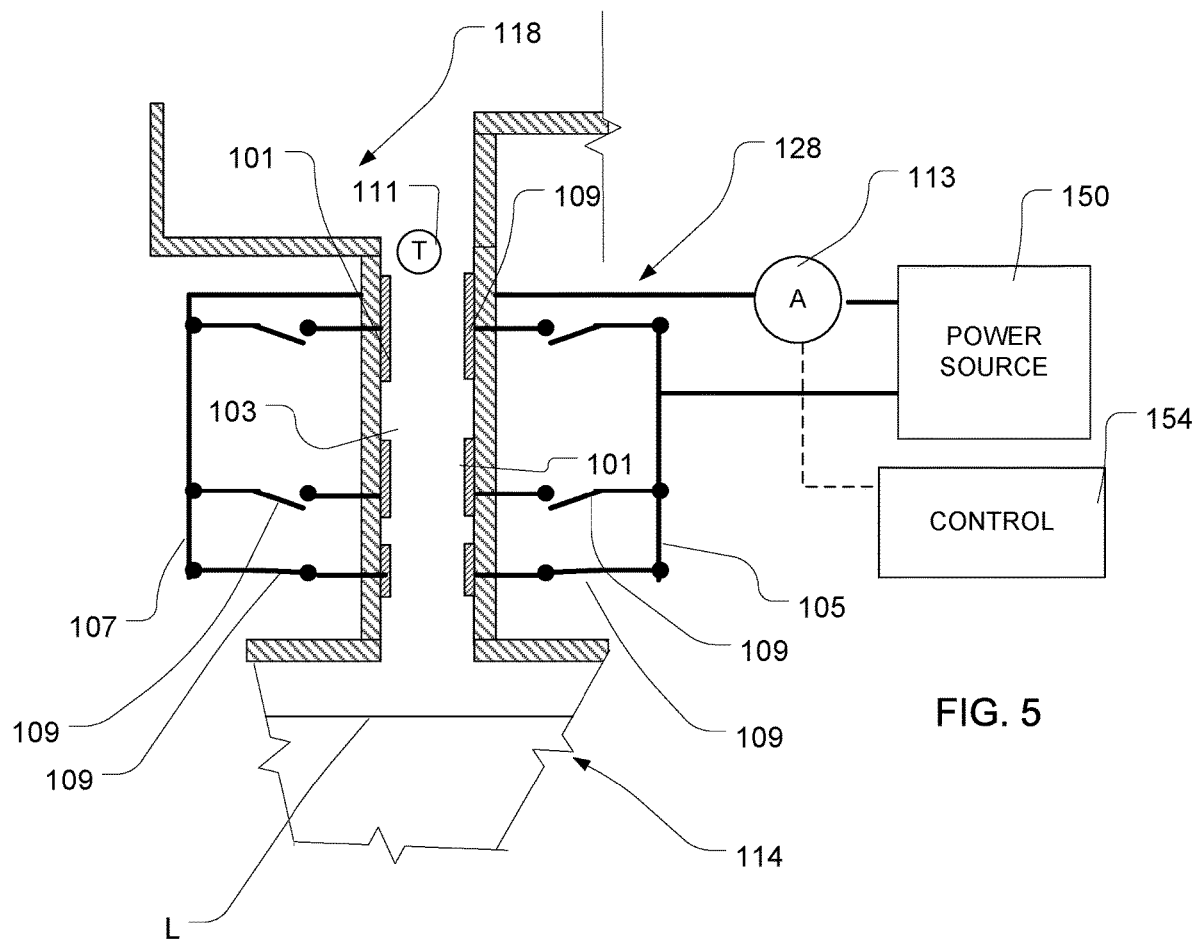
FIG. 5 is a diagrammatic fragmentary sectional view depicting portions of a carafe according to a further embodiment of the invention.

In a further variant, the heater itself may act to detect liquid flowing along the hot liquid path. For example, a heater as partially depicted in FIG. 5 includes an ohmic heater 128 which has electrodes 101 disposed within a conduit 103 forming a part of the hot liquid flow path between the reservoir 114 and the hot liquid outlet or spout 118. The electrodes are connected to opposite poles 105 and 107 of the power source 150 through switches 109 such as semiconductor switches which are controlled by control circuit 154. The control circuit is arranged to normally leave at least one pair of switches 109 closed so that at least two electrodes are connected to opposite poles of the power source and thus are maintained at different voltages. In this embodiment, the controller is operative to select different combinations of electrodes by opening and closed switches 109 to vary the heating rate applied by the heater while liquid is flowing through the heater, responsive to input from a temperature sensor 111 as to maintain the hot liquid reaching the hot liquid outlet spout 118 at a set point temperature.

Conduit 103, and the hot liquid flow path as a whole, are arranged so that when the carafe is at a rest position, with the level of liquid L below the level of the heater, liquid will drain out of the heater into the reservoir. Thus, while the carafe is in the rest position and no hot liquid is being dispensed, the conduit 103 will be substantially or entirely devoid of liquid. In this condition, the electrodes which are connected to opposite poles of the power supply will be electrically isolated from one another. In this condition, no current will flow from the power supply through the electrodes, and the heater will remain inactive. When the carafe is tilted to direct liquid through the hot liquid flow path, the electrodes will be electrically connected to one another and the heater will become active. Stated another way, an ohmic heater may be self-activating. The control circuit 154 may detect current flow using a current sensor 113 and may select electrodes to control the temperature of the hot liquid only when current flow to the electrodes is detected.

In a variant, the control circuit 154 may be operative to control the temperature of the hot liquid by varying the average voltage applied by the power source. This approach can be used in addition to selection of electrodes as discussed above or instead of electrode selection. In the latter case, the switches 109 may be omitted.

In a further variant, the control circuit can be entirely omitted, so that the user can control the temperature of the hot liquid by varying the flow rate.

The carafe discussed above provides a unique and convenient user experience. Once the user has set the user inputs, the user can dispense either hot or cold liquid at will simply by picking up the carafe and tilting it in the appropriate direction.

Typically, the hot liquid discharge temperature selected by the user will depend on the use of the liquid. For example, water used to brew coffee or reconstitute coffee from a powder typically should be at 195-205° F. (90.5 to 96.1° C.) depending on the type of coffee, whereas teas are brewed at 175° F. (79.4° C.), and water used to prepare baby formula desirably is at a lower temperature.

Figure 6:
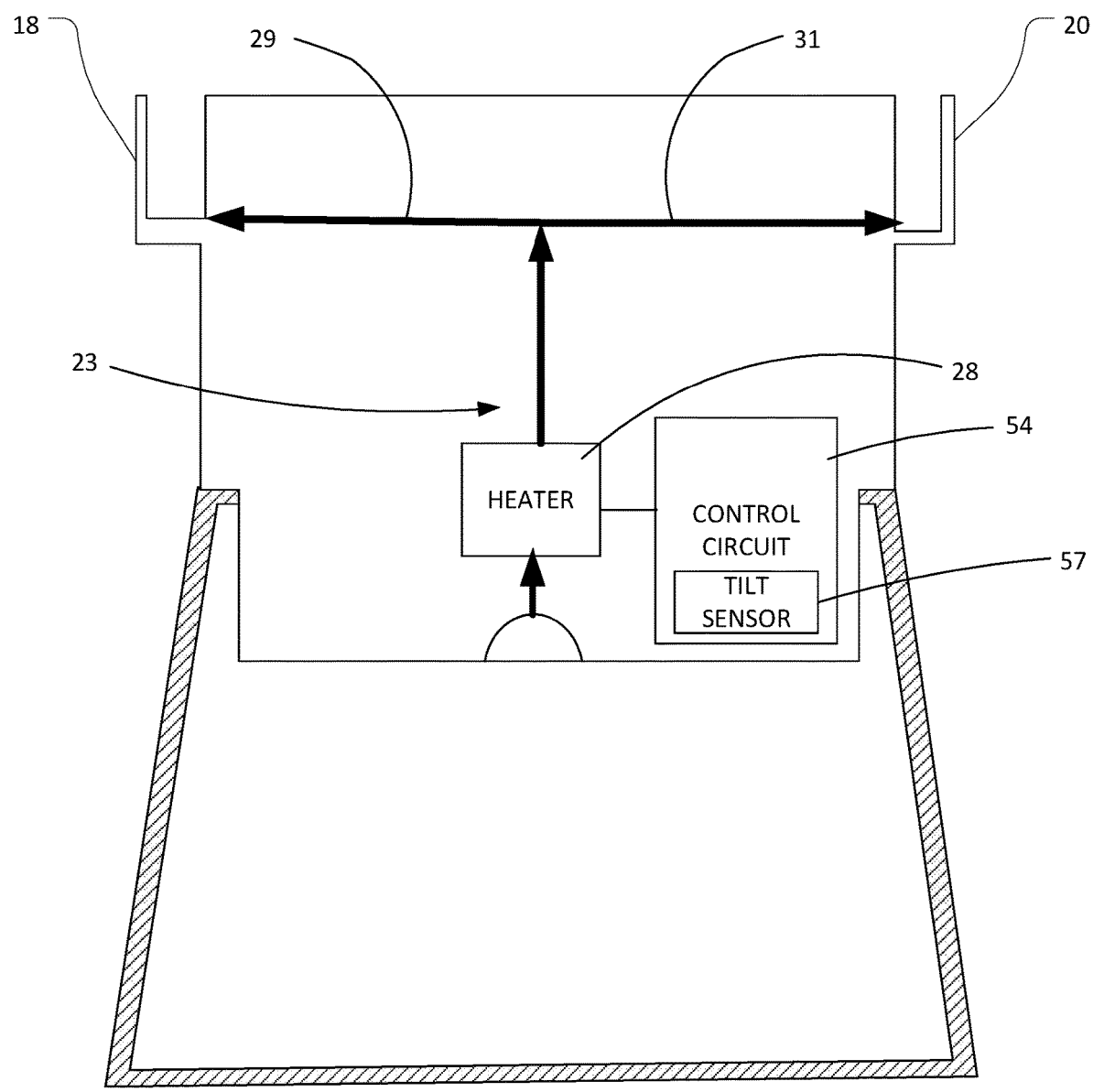
FIG. 6 is a diagrammatic view depicting a carafe according to a further embodiment of the invention.

The features described above can be varied. For example, one or both of the flow control devices can be omitted, in which case the user can control the flow rate by varying the angle of tilt of the housing. The housing can be of essentially any size and shape, but most typically is sized so that the user can handle it conveniently. It is not essential to provide two entirely separate flow paths. A variant of the carafe discussed above with reference to FIGS. 1-4 is schematically depicted in FIG. 6. In this variant, a single flow path 23 extends through the heater 28 and branches downstream of the heater, with one branch 29 extending to the hot liquid spout 18 and another branch 31 extending to the cold liquid spout 20. The control system 54 may include a tilt sensor 57, so that the heater remains off and does not heat the liquid when the carafe is tilted in the second direction to dispense cold water through cold liquid spout 20.

In the embodiments discussed above, the carafe detects when hot liquid is to be dispensed by using elements which detect the direction of tilt of the housing, either directly or by detecting flow or pressure resulting from the tilt. As discussed above, the use of an ohmic heater or other heater operating in an instantaneous mode provides significant benefits including the ability to operate on battery power. These benefits can be realized in other types of carafes. For example, a carafe may incorporate a housing which remains standing on a table during normal operation, and a pump operable by the user to pump water out of the carafe. In a further embodiment of the present invention, such a carafe may incorporate two pumps. One pump is actuated to draw hot liquid, whereas the other pump is actuated to draw cold liquid. In such a carafe, switches or other sensors operable to detect movement of the handles can act to detect whether hot liquid is to be delivered. In a variant of this approach, a single pump may be equipped with two handles, one for hot liquid and one for cold liquid. Here again, the control system may be arranged to leave the heater off when cold liquid is required. Still other types of carafes include an outlet valve at the bottom of the carafe, and a handle which can be actuated by the user to open the valve. Such a carafe can be arranged so that movement of the handle in one direction opens the valve and indicates that hot liquid is to be delivered, whereas movement of the handle in the opposite direction opens the valve and indicates that cold liquid is to be delivered. In such an arrangement, a sensor which detects the direction of movement of the handle can be used to detect that hot liquid is to be delivered. In still further variants, the carafe can be provided with a user operable control element separate from the elements which are used to initiate liquid flow, such as a switch, to demand hot or cold water. As is apparent from the foregoing description, the term "carafe" as used in this document is not restricted to a container of a particular shape, and is not restricted to a container which is adapted to dispense liquid by lifting and pouring. Thus the term "carafe" as used herein is synonymous with the term "container."

As will be appreciated from the foregoing description, the carafe may be operated to dispense only hot liquid. If the function of dispensing cold liquid is not needed, the cold liquid outlet (such as cold liquid spout 20, FIG. 1) and cold liquid flow path (34, FIG. 1) are omitted.

As numerous further variations and combinations of the features discussed above can be used, the foregoing description should be taken as illustrating, rather than as limiting, the present invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

The invention claimed is:

1. A portable carafe for dispensing a liquid, the carafe comprising:
   (a) a housing defining a cold liquid reservoir, a cold liquid spout and a hot liquid spout separate from the cold liquid spout;
   (b) a flow structure disposed in the housing defining one or more flow paths connecting the reservoir with the spouts so that the liquid will be dispensed from the reservoir through the cold liquid spout when the housing is tilted toward the cold liquid spout and the liquid will be dispensed from the hot liquid spout when the housing is tilted toward the hot liquid spout;
   (c) a heater disposed in the housing and connected in one of the one or more flow paths so that the heater can heat the liquid flowing from the reservoir to the hot liquid spout.

2. A carafe as claimed in claim 1 further comprising a control circuit operative to control the heater to heat the liquid flowing from the reservoir to the hot liquid spout to a set point temperature.

3. A carafe as claimed in claim 1 wherein the control circuit is operative to activate the heater when the liquid is flowing to the hot liquid spout and to deactivate the heater when the liquid is not flowing to the hot liquid spout.

4. A carafe as claimed in claim 1 wherein the heater is an ohmic heater operative to heat liquid by directing an electrical current through the liquid.

5. A carafe as claimed in claim 1 wherein the one or more flow paths include a hot liquid flow path extending through the heater and a cold liquid flow path which does not extend through the heater.

6. A carafe as claimed in claim 5 wherein the carafe is arranged so that tilting the carafe in one direction will direct the liquid through the hot liquid flow path to the hot liquid spout, whereas tilting the carafe in a second direction different from the first direction will direct the liquid through the cold liquid path to the cold liquid spout.

7. A carafe as claimed in claim 5 wherein the hot liquid spout is disposed on a first side of the housing and the hot liquid flow path has a first inlet port communicating with the reservoir on the first side of the housing, and wherein the cold liquid spout is disposed on a second side of the housing opposite from the first said, the cold liquid flow path having a second inlet port communicating with the reservoir on a second side of the housing.

\* \* \* \* \*